United States Patent
Jang

(10) Patent No.: US 12,199,447 B2
(45) Date of Patent: Jan. 14, 2025

(54) ANTENNA MODULE

(71) Applicant: AMOSENSE CO., LTD., Cheonan-si (KR)

(72) Inventor: Kiljae Jang, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 8 days.

(21) Appl. No.: 18/275,868

(22) PCT Filed: Jan. 24, 2022

(86) PCT No.: PCT/KR2022/001241
§ 371 (c)(1),
(2) Date: Aug. 4, 2023

(87) PCT Pub. No.: WO2022/169162
PCT Pub. Date: Aug. 11, 2022

(65) Prior Publication Data
US 2024/0120645 A1    Apr. 11, 2024

(30) Foreign Application Priority Data
Feb. 5, 2021   (KR) .................. 10-2021-0016424

(51) Int. Cl.
*H02J 50/00*    (2016.01)
*H01F 7/02*    (2006.01)
(Continued)

(52) U.S. Cl.
CPC ............ *H02J 50/10* (2016.02); *H01F 7/0231* (2013.01); *H01Q 1/248* (2013.01); *H02J 50/005* (2020.01); *H02J 50/70* (2016.02); *H02J 50/90* (2016.02)

(58) Field of Classification Search
CPC .. H02J 50/10; H02J 50/90; H02J 50/70; H02J 50/005; H02J 50/00; H01F 7/0231; H01F 7/02; H01Q 1/248; H01Q 1/24
See application file for complete search history.

(56) References Cited

U.S. PATENT DOCUMENTS

2012/0235636 A1   9/2012  Partovi
2014/0091758 A1   4/2014  Hidaka et al.
(Continued)

FOREIGN PATENT DOCUMENTS

IN    211089831 U    7/2020
JP    2014-036116 A   2/2014
(Continued)

OTHER PUBLICATIONS

KR Office Action dated Apr. 6, 2023 as received in Application No. 10-2022-0014866.
(Continued)

*Primary Examiner* — Robert L Deberadinis
(74) *Attorney, Agent, or Firm* — Maschoff Brennan

(57) ABSTRACT

Proposed is an antenna module in which a partial area, which overlaps with a magnet mounted on an antenna sheet, of the entire area of a shielding sheet is punched out to prevent the shielding sheet from being magnetically saturated (magnetized) by the magnet. The proposed antenna module comprises: the antenna sheet having a radiation pattern formed thereon and having a magnet array formed along the outer circumference of the radiation pattern inserted thereto; and the shielding sheet laminated on the antenna sheet, and having an anti-overlapping hole formed in the area overlapping with the magnet array.

8 Claims, 8 Drawing Sheets

(51) Int. Cl.
    *H01Q 1/24*     (2006.01)
    *H02J 50/10*     (2016.01)
    *H02J 50/70*     (2016.01)
    *H02J 50/90*     (2016.01)

(56) References Cited

U.S. PATENT DOCUMENTS

| | | |
|---|---|---|
| 2019/0044391 A1 | 2/2019 | Jang et al. |
| 2019/0386389 A1 | 12/2019 | Ichikawa |
| 2021/0328628 A1 | 10/2021 | Baek et al. |

FOREIGN PATENT DOCUMENTS

| | | |
|---|---|---|
| KR | 10-2015-0117082 A | 10/2015 |
| KR | 10-2017-0010868 A | 2/2017 |
| KR | 10-2019-0069365 A | 6/2019 |
| KR | 10-2020-0026140 A | 3/2020 |
| WO | 2010/129369 A2 | 11/2010 |

OTHER PUBLICATIONS

KR Office Action dated Jun. 27, 2023 as received in Application No. 10-2022-0014866.

[FIG. 1]
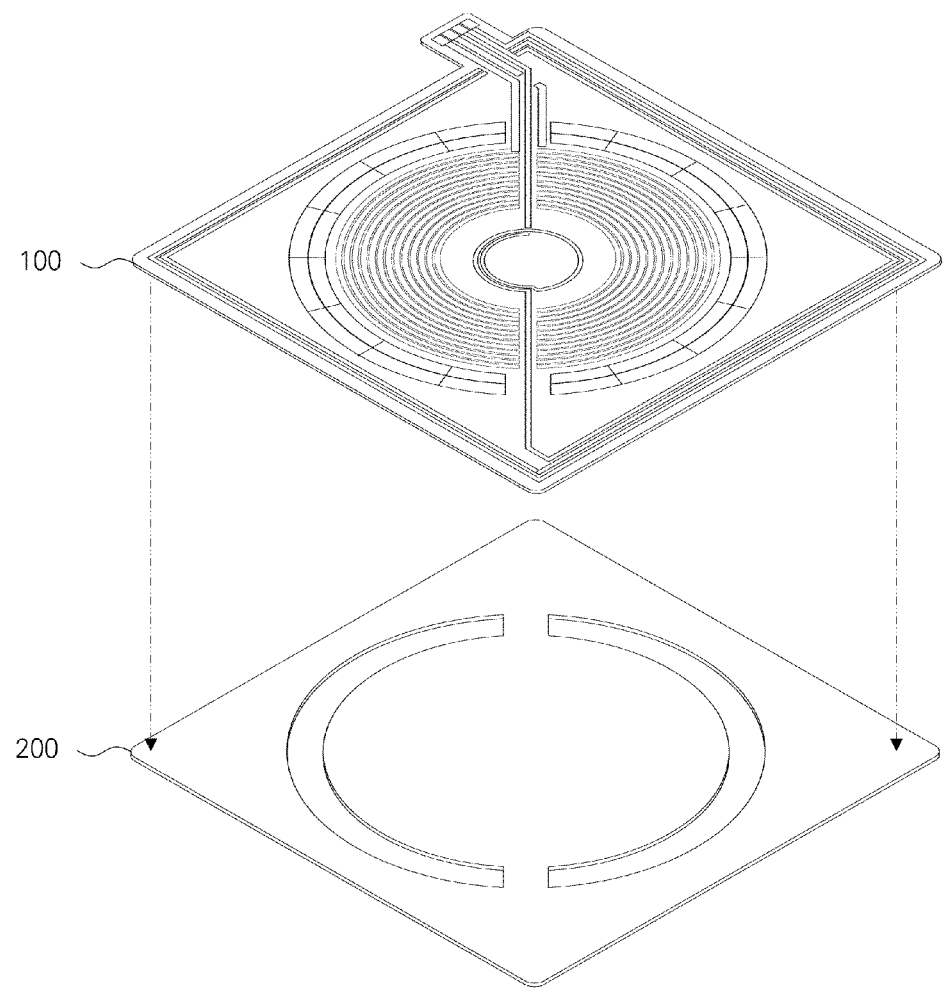

[FIG. 2]
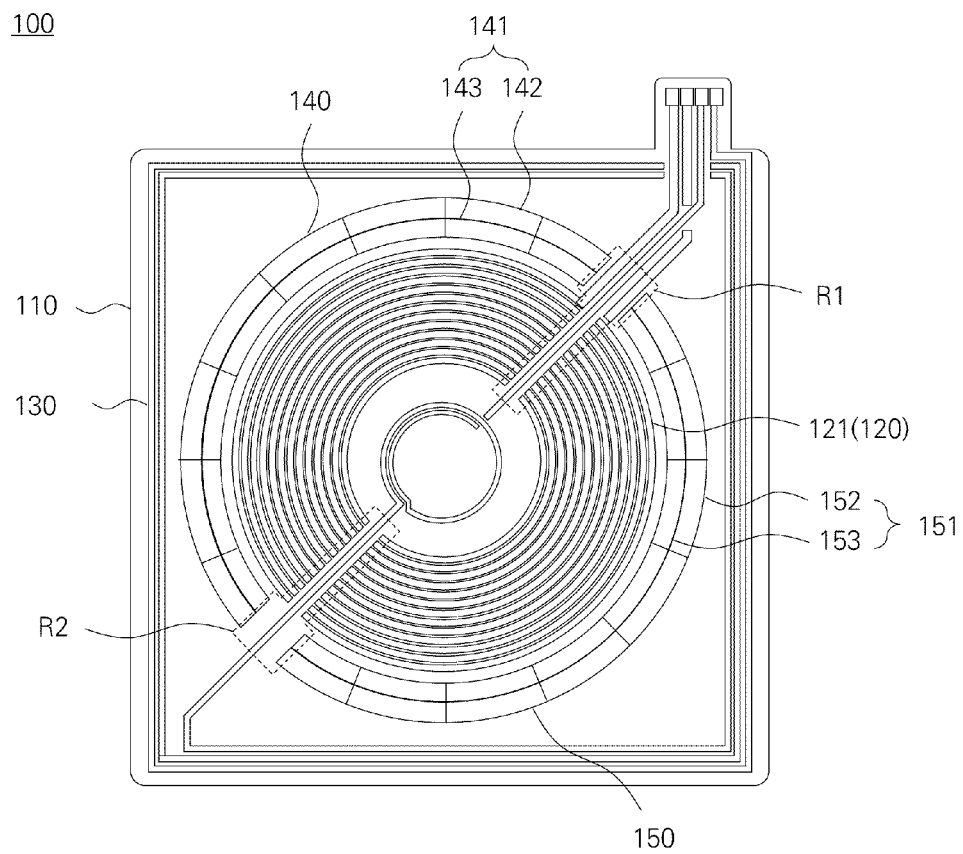

[FIG. 3]
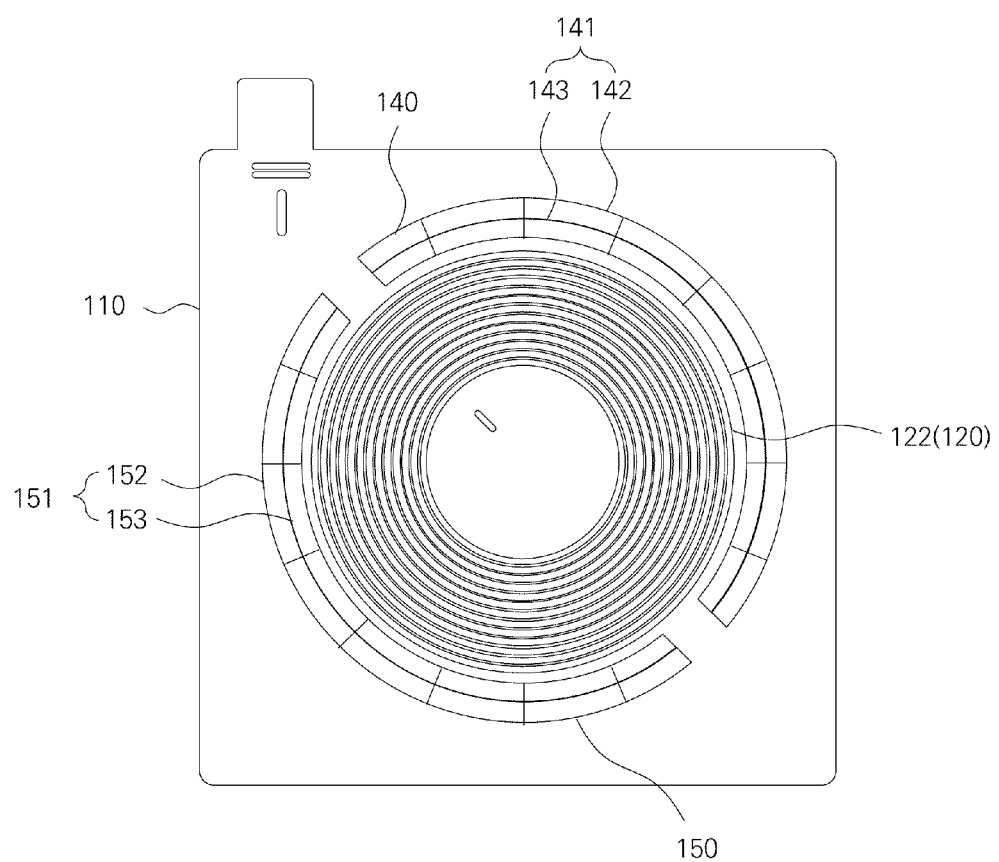

[FIG. 4]
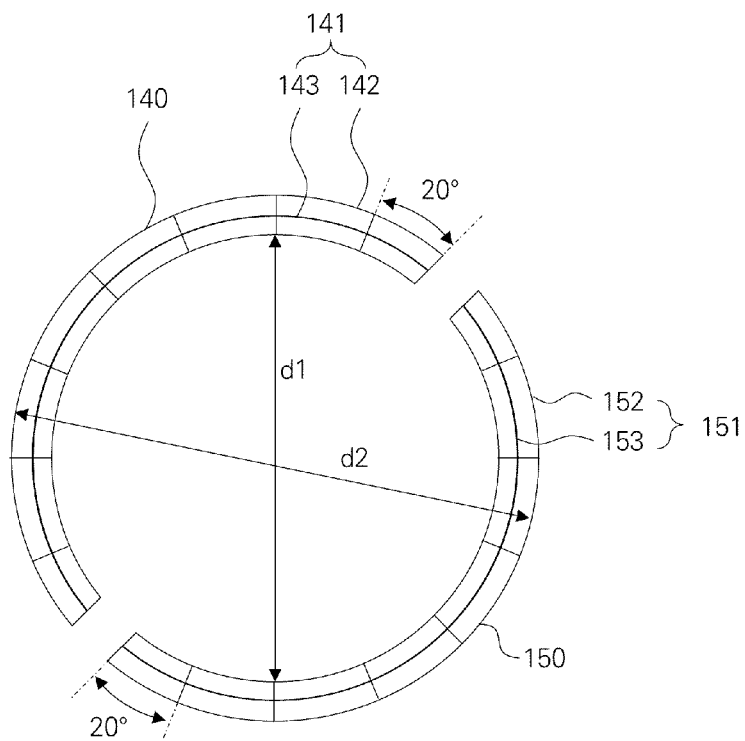
[FIG. 5]
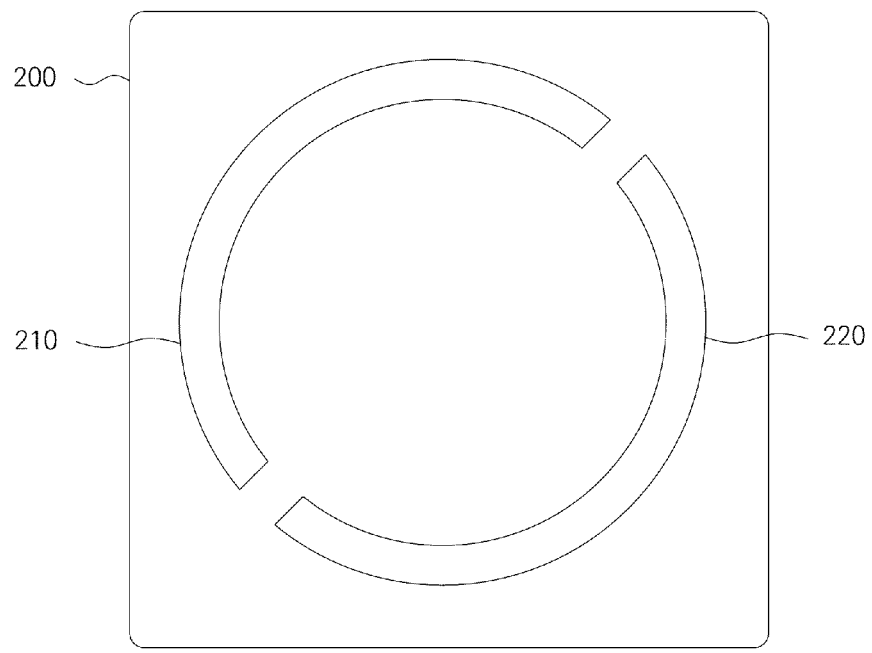

[FIG. 6]
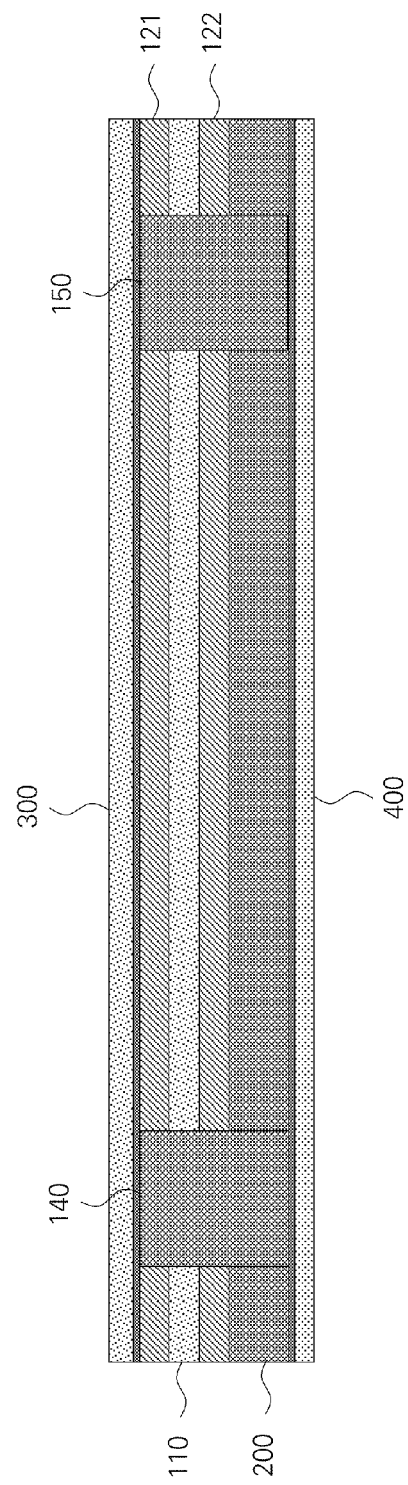

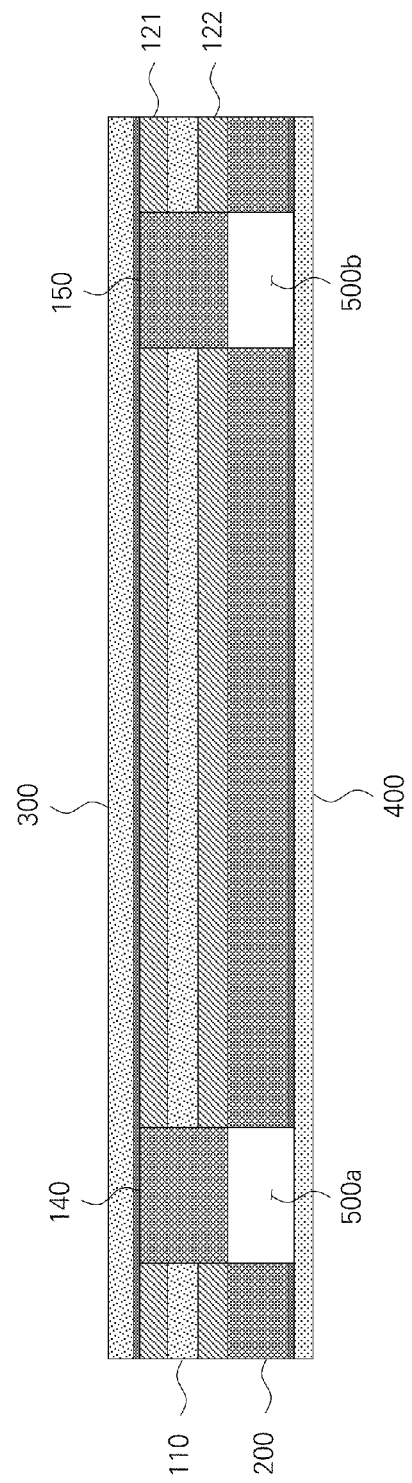

[FIG. 8]
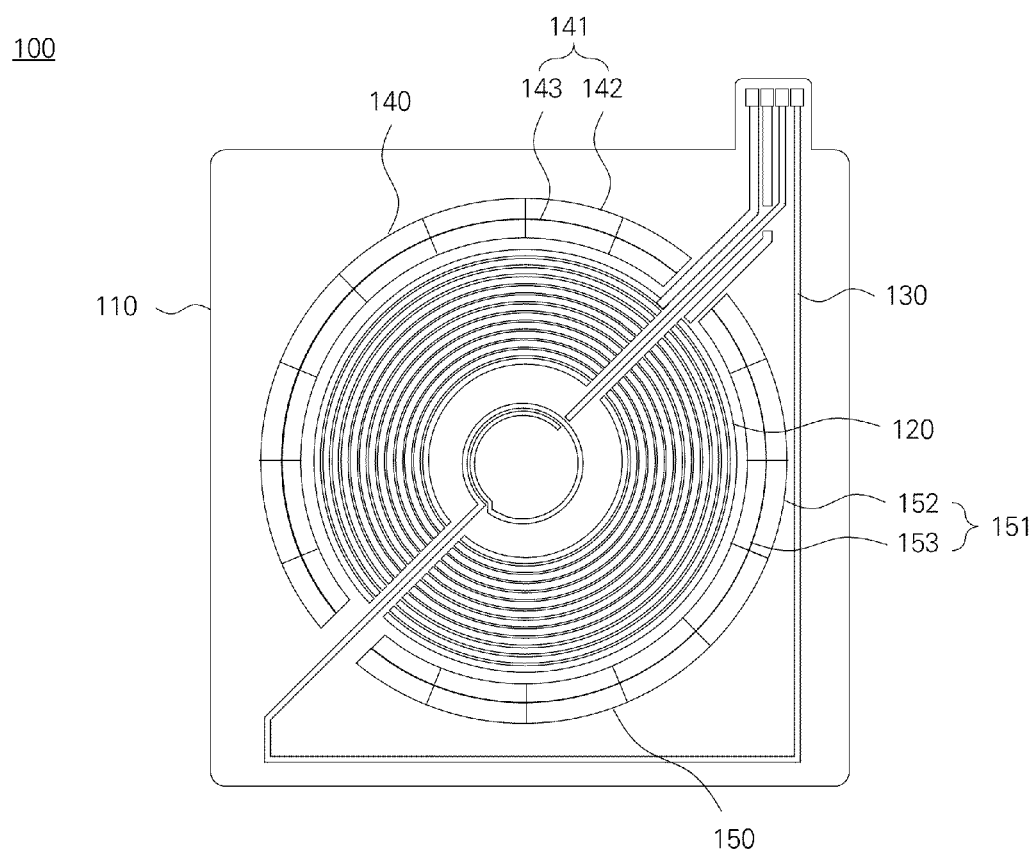

[FIG. 9]
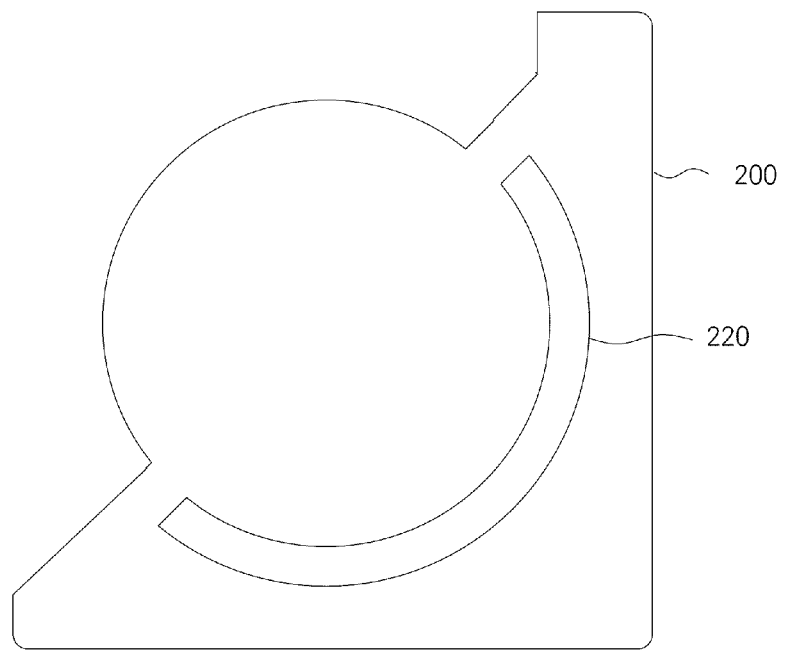

ANTENNA MODULE

TECHNICAL FIELD

The present disclosure relates to an antenna module, and more particularly, to an antenna module, which is mounted on a portable terminal, and supports wireless power transmission.

BACKGROUND ART

A mobile terminal charges a built-in battery by using a charging cable, and is driven by a power charged in the battery. Recently, with the development of wireless power transmission technology, a method for wirelessly charging a battery by using the wireless power transmission technology has been applied to a portable terminal.

Wireless charging is a charging method for wirelessly transmitting a power through coil-type antennas built in a transmission side (Tx, charger) and a reception side (Rx, portable terminal).

In case of slow charge, the wireless charging has specified charge efficiency even in a state where alignment of an antenna on the transmission side and an antenna on the reception side is not correct.

However, in case of fast charge, if the alignment of the antenna on the transmission side and the antenna on the reception side is not correct, the charge efficiency of the wireless charging is degraded, and during the charging, heat generation of the portable terminal and/or the charger becomes severe.

Accordingly, various researches have been made to correctly align the antenna of the portable terminal and the antenna of the charger when mounting the charger on the portable terminal.

SUMMARY OF INVENTION

Technical Problem

The present disclosure has been proposed to solve the above-described problems, and an object of the present disclosure is to provide an antenna module, which can prevent a shielding sheet from being magnetically saturated (magnetized) by a magnet mounted on an antenna sheet by punching a partial area of an entire area of the shielding sheet, which overlaps the magnet.

Solution to Problem

In order to achieve the above object, an antenna module according to an embodiment of the present disclosure includes: an antenna sheet having a radiation pattern formed thereon and having a magnet array, formed along an outer periphery of the radiation pattern, inserted therein; and a shielding sheet laminated on the antenna sheet, and having an anti-overlap hole formed in an area overlapping the magnet array.

The magnetic array may include a plurality of magnet units arranged in an annular arc shape along the outer periphery of the radiation pattern, and the magnet unit may include: an S-pole permanent magnet disposed spaced apart from the outer periphery of the radiation pattern; and an N-pole permanent magnet disposed between the outer periphery of the radiation pattern and the S-pole permanent magnet.

The antenna sheet may include: a base sheet having a first through-hole and a second through-hole formed thereon; a first radiation pattern formed on the base sheet, and formed in a loop shape having an entry path and an exit path; a second radiation pattern formed on the base sheet, configured to form an inner loop by entering an inner periphery area of the first radiation pattern through the entry path, and disposed outside the first radiation pattern through the exit path; a first magnet array configured to penetrate the first through-hole, and disposed along an outer periphery of the first radiation pattern; and a second magnet array configured to be spaced apart from the first magnet array and to penetrate the second through-hole, and disposed along the outer periphery of the first radiation pattern.

The first radiation pattern may include: an upper radiation pattern formed on a first surface of the base sheet; and a lower radiation pattern formed on a second surface of the base sheet, and connected to the upper radiation pattern through a via-hole penetrating the base sheet, and the upper radiation pattern may be formed in a loop shape having the entry path and the exit path.

The first magnetic array and the second magnet array may be disposed so that both ends thereof face each other, may be spaced apart from each other, and may be configured to form an entry path and an exit path of the second radiation pattern.

The antenna sheet may include a first magnet array and a second magnet array, and the shielding sheet may include: a first anti-overlap hole formed in an area of the shielding sheet, overlapping the first magnet array; and a second anti-overlap hole formed in an area of the shielding sheet, overlapping the second magnet array.

The first magnet array may be accommodated in the first anti-overlap hole through penetration of the antenna sheet, and the second magnet array may be accommodated in the second anti-overlap hole through penetration of the antenna sheet.

The antenna module may further include a thermal spread sheet laminated on the shielding sheet, and the first anti-overlap hole may be configured to form a first opening between the first magnet array and the thermal spread sheet, and the second anti-overlap hole may be configured to form a second opening between the second magnet array and the thermal spread sheet.

Advantageous Effects of Invention

According to the present disclosure, the antenna module has the effect of being able to prevent the shielding sheet from being magnetically saturated (magnetized) by the magnet mounted on the antenna sheet by punching the partial area of the entire area of the shielding sheet, which overlaps the magnet.

Further, the antenna module has the effect of being able to prevent the shielding performance of the shielding sheet from being degraded by punching the partial area of the entire area of the shielding sheet, which overlaps the magnet mounted on the antenna sheet.

Further, the antenna module has the effect of being able to prevent the characteristic of the antenna module, such as inductance or charge efficiency, from being degraded by preventing the shielding sheet from being magnetically saturated (magnetized) by the magnet mounted on the antenna sheet through punching of the partial area of the entire area of the shielding sheet, which overlaps the magnet.

BRIEF DESCRIPTION OF DRAWINGS

FIG. 1 is a view explaining an antenna module according to an embodiment of the present disclosure.

FIG. 2 is a top view explaining the antenna sheet of FIG. 1.

FIG. 3 is a bottom view explaining the antenna sheet of FIG. 2.

FIG. 4 is a view explaining a first magnet array and a second magnet array of FIG. 3.

FIG. 5 is a view explaining a magnetic sheet of FIG. 1.

FIG. 6 is a view explaining a laminated structure of an antenna module according to an embodiment of the present disclosure.

FIG. 7 is a view explaining a modified example of a laminated structure of an antenna module according to an embodiment of the present disclosure.

FIGS. 8 and 9 are views explaining a modified example of an antenna module according to an embodiment of the present disclosure.

DESCRIPTION OF EMBODIMENTS

For detailed explanation to the extent that those of ordinary skill in the art to which the present disclosure pertains can easily embody the technical idea of the present disclosure, the most preferred embodiment of the present disclosure will be described with reference to the accompanying drawings. First, in giving reference numerals to constituent elements of the respective drawings, it is to be noted that the same constituent elements have possibly the same reference numerals although they are denoted in different drawings. Further, in describing the present disclosure, detailed explanation of related known constitutions or functions will be omitted in case that such detailed explanation may obscure the subject matter of the present disclosure.

Referring to FIG. 1, an antenna module according to an embodiment of the present disclosure is configured to include an antenna sheet 100 having a first surface and a second surface, and a shielding sheet 200 disposed on the second surface of the antenna sheet 100.

On the antenna sheet 100, a plurality of radiation patterns that resonate in different frequency bands are formed. As an example, on the antenna sheet 100, a first radiation pattern 120 for wireless power transmission and a second radiation pattern 130 for short range communication are formed. On the antenna sheet 100, a magnet that derives alignment of the antenna sheet 100 and a wireless charger is disposed. On the antenna sheet 100, a magnet in an annular arc shape is disposed along an outer periphery of the first radiation pattern 120.

Referring to FIGS. 2 and 3, the antenna sheet 100 includes a base sheet 110, a first radiation pattern 120, a second radiation pattern 130, a first magnet array 140, and a second magnet array 150.

The base sheet 110 is a plate type material having a first surface and a second surface. As an example, the base sheet 110 is a resin sheet formed of a material, such as polyimide.

The first radiation pattern 120 is a radiation pattern for wireless power transmission. The first radiation pattern 120 is composed of an upper radiation pattern 121 and a lower radiation pattern 122.

The upper radiation pattern 121 is formed on the first surface of the base sheet 110, and forms a first loop that is wound plural times on the first surface of the base sheet 110. In this case, the upper radiation pattern 121 forms an entry path R1 where the second radiation pattern 130 enters from an outside of the first loop into an inner periphery of the first loop and an exit path R2 where the second radiation pattern 130 exits from the inner periphery of the first loop to the outside of the first loop.

Here, the entry path R1 and the exit path R2 mean paths which the second radiation pattern 130 crosses in order to form an inner loop in an inner periphery area of the first loop. The entry path R1 and the exit path R2 are formed to extend from the inner periphery of the first loop toward an outer periphery direction and to cross the first radiation pattern 120. The entry path R1 and the exit path R2 are spaces where the first radiation pattern 120 is not formed in the first loop, and the first radiation pattern 120 is not disposed in the entry path R1 and the exit path R2.

The lower radiation pattern 122 is formed on the second surface of the base sheet 110, and forms a second loop that is wound plural times on the second surface of the base sheet 110. The lower radiation pattern 122 is connected to the upper radiation pattern 121 through a plurality of via-holes that penetrate the base sheet 110.

The outside diameters of the first loop of the upper radiation pattern 121 and the second loop of the lower radiation pattern 122 are about 38Φ.

The second radiation pattern 130 is formed on the first surface of the base sheet 110. The second radiation pattern 130 enters the inner periphery of the first loop of the first radiation pattern 120 through the entry path R1, and forms an inner loop in an inner peripheral area of the first loop. After forming the inner loop, the second radiation pattern 130 exits to the outside of the first loop of the first radiation pattern 120 through the exit path R2. After exiting to the outside of the first loop, the second radiation pattern 130 forms a third loop by being wound plural times on the first surface of the base sheet 110.

On the base sheet 110, through-holes that are penetrated by the first magnet array 140 and the second magnet array 150 are formed. On the base sheet 110, a first through-hole that is penetrated by the first magnet array 140 and a second through-hole that is penetrated by the second magnet array 150 are formed. The first through-hole and the second through-hole are formed to be spaced apart over a predetermined interval from the outer periphery of the loop formed by the first radiation pattern 120. In this case, it is exemplified that the first through-hole and the second through-hole are spaced apart for about 1 mm from the outer periphery of the first radiation pattern 120.

The first magnet array 140 is configured so that a plurality of magnets are arranged in an annular arc shape. One end of the first magnet array 140 is disposed on the first surface and the second surface of the first base sheet 110 through penetration of the first through-hole of the base sheet 110. The first magnet array 140 is disposed along the outer periphery of the first radiation pattern 120, and includes a plurality of first magnet units 141 that form the annular arc shape. The first magnet unit 141 is configured to include an S-pole permanent magnet 142 disposed to be spaced apart from the outer periphery of the first radiation pattern 120, and an N-pole permanent magnet 143 disposed to be spaced apart from the outer periphery of the first radiation pattern 120, and disposed between the S-pole permanent magnet 142 and the outer periphery of the first radiation pattern 120.

The second magnet array 150 is configured so that a plurality of magnets are arranged in an annular arc shape. One end of the second magnet array 150 is disposed on the first surface and the second surface of the first base sheet 110 through penetration of the second through-hole of the base sheet 110. The second magnet array 150 is disposed along the outer periphery of the first radiation pattern 120, and includes a plurality of second magnet units 151 that form the annular arc shape. The second magnet unit 151 is configured to include an S-pole permanent magnet 152 disposed to be spaced apart from the outer periphery of the first radiation pattern 120, and an N-pole permanent magnet 153 disposed to be spaced apart from the outer periphery of the first radiation pattern 120, and disposed between the S-pole permanent magnet 152 and the outer periphery of the first radiation pattern 120.

The first magnet array 140 is disposed counterclockwise along the outer periphery of the first radiation pattern 120 from a position adjacent to the entry path R1 of the first radiation pattern 120 to a position adjacent to the exit path R2. The second magnet array 150 is disposed counterclockwise along the outer periphery of the first radiation pattern 120 from the position adjacent to the exit path R2 of the first radiation pattern 120 to the position adjacent to the entry path R1. In this case, both ends of the first magnet array 140 and the second magnet array 150 are disposed to face each other, are spaced apart from each other, and form the entry path R1 and the exit path R2 of the second radiation pattern 130.

Referring to FIG. 4, the first magnet array 140 and the second magnet array 150 form an annular shape in which N-pole permanent magnets 143 and 153 are disposed on the inside of the first magnet array 140 and the second magnet array 150, and S-pole permanent magnets 142 and 152 are disposed on the outside thereof. In this case, the N-pole permanent magnets 143 and 153 and the S-pole permanent magnets 142 and 152 that constitute the first magnet array 140 and the second magnet array 150 are formed in an arc shape having an angle of about 20 degrees. The inner periphery diameter d1 of the annular arc shape formed by the first magnet array 140 and the second magnet array 150 is about 38 mm, and the outer periphery diameter d2 of the annular shape is about 46 mm.

The width of the S-pole permanent magnets 142 and 152 and the N-pole permanent magnets 143 and 153 that constitute the first electrode unit and the second electrode unit is about 3 mm, and the thickness thereof is about 300 μm to 400 μm.

The shielding sheet 200 is a plate type material formed of a magnetic material having a first surface and a second surface, and is laminated on the second surface of the base sheet 110.

In case that the shielding sheet 200 overlaps the first magnet array 140 and the second magnet array 150, it may be magnetically saturated (magnetized) by magnetism that is generated from the N-pole permanent magnets 143 and 153 and the S-pole permanent magnets 142 and 152, and due to this, the shielding performance may be degraded, or the antenna characteristic, such as inductance or charging efficiency, may be changed.

Accordingly, the antenna module according to an embodiment of the present disclosure can prevent the degrading of the shielding performance and the characteristic deterioration of the antenna module, such as inductance or charge efficiency, by preventing the shielding sheet 200 from being magnetically saturated (magnetized) by the magnet mounted on the base sheet 110 through punching of the partial area of the entire area of the shielding sheet 200, which overlaps the magnet.

That is, referring to FIG. 5, anti-overlap holes are formed on an area of the shielding sheet 200 that overlaps the first magnet array 140 and the second magnet array 150 of the base sheet 110. That is, the anti-overlap holes are formed by removing (punching) the area, which overlaps the first magnet array 140 and the second magnet array 150, of the entire area of the shielding sheet 200.

On the shielding sheet 200, a first anti-overlap hole 210 corresponding to the first magnet array 140 and a second anti-overlap hole 220 corresponding to the second magnet array 150 are formed. The first anti-overlap hole 210 may overlap the first through-hole formed on the base sheet 110, and the second anti-overlap hole 220 may overlap the second through-hole formed on the base sheet 110.

Meanwhile, the antenna module may further include a protection sheet 300 laminated on the first surface of the base sheet 110, and a thermal spread sheet 400 laminated on the second surface of the shielding sheet 200. It is possible to properly select the thickness of the first radiation pattern 120 and the thickness (or the number of layers) of the shielding sheet 200 depending on the thicknesses of the first magnet array 140 and the second magnet array 150.

Referring to FIG. 6, the first magnet array 140 and the second magnet array 150 are accommodated in the anti-overlap holes. That is, a part of the first magnet array 140 is accommodated in the first through-hole of the base sheet 110, and the other part (end part of the first magnet array 140 having penetrated the first through-hole) thereof is accommodated in the first anti-overlap hole 210 of the shielding sheet 200. A part of the second magnet array 150 is accommodated in the second through-hole of the base sheet 110, and the other part (end part of the second magnet array 150 having penetrated the second through-hole) thereof is accommodated in the second anti-overlap hole 220 of the shielding sheet 200.

Referring to FIG. 7, the first anti-overlap hole 210 and the second anti-overlap hole 220 may form openings 500a and 500b between the first magnet array 140 and the second magnet array 150 and the thermal spread sheet 400. That is, the first opening 500a is formed between the end part of the first magnet array 140, the first anti-overlap hole 210, and the thermal spread sheet 400, and the second opening 500b is formed between the end part of the second magnet array 150, the second anti-overlap hole 220, and the thermal spread sheet 400.

Referring to FIGS. 8 and 9, an area S1 where the second radiation pattern 130 is not formed may exist on the base sheet 110 depending on the characteristic required for the base sheet 110. That is, the second radiation pattern 130 may be formed adjacent to only the inner periphery area of the first radiation pattern 120 and two adjacent sides of the base sheet 110. In this case, the area that overlapping the area where the second radiation pattern 130 is not formed may be partially removed from the shielding sheet 200.

As described above, although a preferred embodiment according to the present disclosure has been described, it is understood that various modifications are possible, and those of ordinary skill in the art can make various modification examples and correction examples without deviating from the claims of the present disclosure.

The invention claimed is:
1. An antenna module comprising:
an antenna sheet having a radiation pattern formed thereon and having a magnet array, formed along an outer periphery of the radiation pattern, inserted therein; and
a shielding sheet laminated on the antenna sheet, and having an anti-overlap hole formed in an area overlapping the magnet array.

2. The antenna module of claim 1, wherein the magnetic array comprises a plurality of magnet units arranged in an annular arc shape along the outer periphery of the radiation pattern, and wherein the magnet unit includes:
an S-pole permanent magnet disposed spaced apart from the outer periphery of the radiation pattern; and
an N-pole permanent magnet disposed between the outer periphery of the radiation pattern and the S-pole permanent magnet.

3. The antenna module of claim 1, wherein the antenna sheet comprises:
a base sheet having a first through-hole and a second through-hole formed thereon;
a first radiation pattern formed on the base sheet, and formed in a loop shape having an entry path and an exit path;
a second radiation pattern formed on the base sheet, configured to form an inner loop by entering an inner periphery area of the first radiation pattern through the entry path, and disposed outside the first radiation pattern through the exit path;
a first magnet array configured to penetrate the first through-hole, and disposed along an outer periphery of the first radiation pattern; and
a second magnet array configured to be spaced apart from the first magnet array and to penetrate the second through-hole, and disposed along the outer periphery of the first radiation pattern.

4. The antenna module of claim 3, wherein the first radiation pattern comprises:
an upper radiation pattern formed on a first surface of the base sheet; and
a lower radiation pattern formed on a second surface of the base sheet, and connected to the upper radiation pattern through a via-hole penetrating the base sheet,
wherein the upper radiation pattern is formed in a loop shape having the entry path and the exit path.

5. The antenna module of claim 3, wherein the first magnetic array and the second magnet array are disposed so that both ends thereof face each other, are spaced apart from each other, and are configured to form an entry path and an exit path of the second radiation pattern.

6. The antenna module of claim 1, wherein the antenna sheet comprises a first magnet array and a second magnet array, and
wherein the shielding sheet includes:
a first anti-overlap hole formed in an area of the shielding sheet, overlapping the first magnet array; and
a second anti-overlap hole formed in an area of the shielding sheet, overlapping the second magnet array.

7. The antenna module of claim 6, wherein the first magnet array is accommodated in the first anti-overlap hole through penetration of the antenna sheet, and the second magnet array is accommodated in the second anti-overlap hole through penetration of the antenna sheet.

8. The antenna module of claim 6, further comprising a thermal spread sheet laminated on the shielding sheet,
wherein the first anti-overlap hole is configured to form a first opening between the first magnet array and the thermal spread sheet, and
wherein the second anti-overlap hole is configured to form a second opening between the second magnet array and the thermal spread sheet.

\* \* \* \* \*